United States Patent [19]

Gargiulo

[11] Patent Number: 5,203,990
[45] Date of Patent: Apr. 20, 1993

[54] INSIDE MULTI-FUNCTIONAL AQUARIUM SPONGE FILTER

[76] Inventor: Joseph C. Gargiulo, P.O. Box 33623, Decatur, Ga. 30033

[21] Appl. No.: 888,349

[22] Filed: May 21, 1992

[51] Int. Cl.$^5$ .............................................. A01K 63/04
[52] U.S. Cl. .......................................... 210/169; 119/5
[58] Field of Search ............ 210/150, 169, 151, 416.2; 119/5

[56] References Cited

U.S. PATENT DOCUMENTS

| | | | |
|---|---|---|---|
| 3,785,494 | 1/1974 | Sama | 210/169 |
| 3,899,424 | 8/1975 | Lake | 210/169 |
| 3,947,362 | 3/1976 | Etani | 210/416.2 |
| 4,295,965 | 10/1981 | Koster | 210/169 |

OTHER PUBLICATIONS

Dirt Magnet Advertisement, published in Tropical Fish Hobbyist Magazine, p. 41, Jun. 1991.

Primary Examiner—Stanley S. Silverman
Assistant Examiner—Robert James Popovics
Attorney, Agent, or Firm—James B. Middleton

[57] ABSTRACT

An inside multi-functional sponge filter for an aquarium tank is described which consists of a vertical cyclindrical sponge filtering medium surrounding two interchangeable cylindrical components which functions as the clean water receiving chamber in which an optional filter medium cartridge can be added. The outer diameter of the sponge is cut with shallow rectangular grooves oriented along the longitudinal axis. The longitudinally oriented slots about the circumference which provide for maximum decontaminated fluid flow rates into the chamber. The two cylindrical components are fitted with other filter sections via male/female connections constructed as part of the component. The lower cylinder is attached to a weighted cylindrical flanged base to prevent floatation. Attached to the upper cylinder is a circular adapter to permit attachment of airline tubing and an optional air diffuser to permit effective aeration and to maximize flow rates as well as to accommodate the utilization of peripheral air supply equipment. The adaptable configuration of the system enables a convenient rearrangement of components to allow pre-filtration of highly contaminated water.

6 Claims, 7 Drawing Sheets

INSIDE MULTI-FUNCTIONAL AQUARIUM SPONGE FILTER

BACKGROUND OF THE INVENTION

1. Field of the Invention

This invention relates to filters for use with aquariums inside of the aquarium, as opposed to filters which are exterior to the aquarium, or mounted to the inside wall of the aquarium. In particular, the present invention is directed to an aquarium filter which has an improved filtering and aeration efficiency while maintaining simplicity and convenience of operation. It also functions as a multiple use system since its readily adaptable design allows for the addition of optional capabilities with peripheral aquarium devices, chemical filtering and pre-filtering.

2. Description of the Prior Art

The numerous filtering systems for today's aquariums include exterior filters and interior filters. Of the interior filters there are floating (suspended), bottom and wall-mounted designs. In the aforementioned, the bottom filter is the most similar to the present invention. These bottom filters are described in U.S. Pat. Nos. 2,782,161; 3,477,580; 4,186,093; 4,620,924; 4,753,723; and 4,842,726. These bottom filters are composed of several compartments which serve a distinct purpose. There is generally a compartment in which the contaminated fluid enters and passes through a filtering medium into a clean fluid chamber. It is then dispersed by source of air which creates an air lift, lifting the decontaminated fluid through a lift tube or chamber and back in to the aquarium.

There are several drawbacks to these systems. First, in large tanks or with high gas flow rates, these filters have a tendency to float, disturbing the hydrodynamic environment and occasionally dismembering the unit, thus introducing additional contaminants. The common construction of the filters including several enclosed compartments requires painstaking labor with brushes to fit into various crevices and corners. In addition to the man-made chemical and/or mechanical filtering system, a biological filtration system resulting from the growth of microorganisms in the non-chemical filtering material is established by the natural environment of the aquarium. Thus, when these filters are cleaned and the filtering material is replaced, the result is the destruction of the biological filtration system which is very critical to the health of optimal water conditions. There is also a problem with many interior aquarium filters wherein small or baby fish can become trapped in the water intake slots.

A critical design criterion which has restricted existing filters is flow rate limitation. This flow restriction bounds the aeration and filtering capabilities of aquarium filters, therefore in larger aquariums, additional filters are needed which take up valuable tank space. Some filter designs have attempted to improve flow rates by reconfiguration of the individual components responsible for fluid intake, filtering or expulsion. All three of these components must be sized and configured as a single unit to prevent flow constriction by another portion of the filter, thus incapacitating improvements to individual filter components.

Accordingly, while the prior art bottom aquarium filters are utilized successfully, further improvements are warranted to alleviate the aforementioned problems.

SUMMARY OF THE INVENTION

It is the primary purpose of the present invention to offer an alternative filter which will eliminate some of the aforementioned prior art problems, while providing an efficient design to permit the multiple applications of the invention.

A major objective of this invention is to provide an aquarium filter which can maintain a biological bacteria medium over an extended period of time. When other filters are cleaned, their mechanical filtration mediums are replaced, thus destroying the microorganisms which grow within the mechanical medium and function as a biological filter. This present invention provides for biological, mechanical and chemical filtration utilizing the same device and requiring less frequent cleanings.

An additional objective of the invention is to offer an inside aquarium filter which substantially increases the filtration/aeration rates of a single filter, thus eliminating the requirement for additional filters and their associated accessories, including multiple air supply devices.

A further intention of this invention is to provide a filter in which the fluid (water) intake area is evenly distributed along a larger intake surface, permitting more efficient decontamination of the fluid.

An additional objective of this invention is to provide an efficient method to provide additional filtration for larger tanks. The filtration surface area can be increased via the addition of sponges stacked vertically so that no additional aquarium bottom space or air supply devices are required.

A further aim of the filter is the protection of the aquatic environment within which the filter operates. All of the water which enters the filter passes directly through the sponge, which does not contain perforations large enough to endanger or trap small or baby fish. There are also no large open intake compartments which can entrap fish. In addition, although increased flow rates are possible with this present invention, the distribution of the intake area over the entire circumference and end plates of the sponge prevents concentrated suction areas which can force small fish or aquatic plants against the filter intake area.

This distribution of the suction area also serves another purpose to allow the use of the sponge as a pre-filter. The main filtering system can be supplemented by an additional sponge filter which will pre-filter the water before reaching the primary filtering system, prolonging the life and the interval between filter cleanings. With the aid of elbow connectors and a graduated adapter, the sponge filter mechanism can be utilized as a pre-filter for a primary filtering system.

Ease of cleaning of not only the filter but also the aquarium is another objective. The sponge filter is easy to clean, requiring several squeezes under running tap water. The chambers are all cylindrical avoiding multiple crevices which are difficult to clean. Further, since the pedestal lifts the filtration medium off the bottom, debris does not collect at the base of the filter and cleaning the bottom of the tank is made easier.

Another objective of this invention is to decrease the occurrence of filter floatation through the design of the pedestal base. The pedestal base is weighted, providing a heavier filter to offset buoyancy effects. The stability of the heavier base is further augmented by the bottom flange which can be positioned beneath the aquarium tank gravel. The pedestal base also lifts the filtration medium off the bottom of the aquarium thus increasing the filtration medium surface area.

Another purpose of this invention is to enable the addition of an optional filtering medium cartridge to permit chemical filtration in addition to mechanical and biological filtration without the addition of a separate filter for this purpose. In comparison with prior art bottom filters, the design of this invention allows for more efficient utilization of a filter medium cartridge because the water suctioned through the cylindrical sides of the cartridge permits water flow through a larger surface area.

Another objective of the sponge filter is to provide a filter with a means to attach a powerhead. The larger air lift chamber offers this as an option.

Briefly, in accordance with the present invention there is offered an inside multi-functional aquarium sponge filter. The basic filter includes a cylindrical sponge filtering medium containing longitudinal grooves which fits as a sleeve over another cylindrical chamber which functions as the receiving chamber for the decontaminated water. The outer longitudinal surface of the sponge is scored with shallow rectangular troughs which act to increase the water intake surface area while maintaining a relatively equivalent distance to the receiving area to insure flow distribution. The receiving chamber is formed by two cylindrical tubes, open at each end. Each end of the cylindrical tube is fashioned into a male and female connector, respectively. These connections provide for easy reconfiguration of the system which is accomplished in a vertical fashion to reduce the required aquarium bottom area. The lowest cylinder, which forms the lower half of a receiving chamber, mates with a cylindrical pedestal base. The base is weighted to prevent filter flotation, and is further stabilized by a circular flanged bottom which can be placed beneath the aquarium gravel. A second cylinder connects with the lower cylinder, and an adapter on the top to form the enclosed receiving chamber. The adapter consists of an outer circular male/female connector attached via radially extending cross-members to an inner spout with attachment points on either side of the adapter. This spout provides the air flowthrough between filter chambers and the attachments points allow for air tubing attachment and/or an air diffuser attachment, dependent upon the specific filter configuration. The adapter permits the attachment of the larger air tube which acts as the air lift chamber.

The contaminated water enters the filter via the exposed sponge medium. The texture of the sponge permits the diffusion of the water throughout the sponge and the distribution of the growth of the bacteria which will function as the biological medium. As the water passes through the sponge, it is decontaminated and passes through the longitudinal open grooves into the receiving chamber. The clean water then exits from the clean water receiving chamber via the airlift chamber. Air tubing which connects to the upper nozzle on the adapter and an optional air diffuser can connect to the lower nozzle to increase air flow rates.

In an embodiment of this invention, a filter medium cartridge can be inserted between the sponge and receiving chamber to permit chemical filtering of the water. The filter cartridge is also designed similarly to the receiving chamber to permit maximum utilization of the medium. It consists of a cylindrical housing with open longitudinal grooves which permit the passage of water from the sponge filtering medium through the chemical filtering medium. The water then passes through the longitudinal slits in the original receiving chamber into the clean water chamber.

The configuration of the filtering system for a larger tank consists of multiple sponge/chemical/receiving chambers stacked vertically to provide more external water intake area. Additional filters attach to the adapter on the lower filter. Unperforated airtubing and the optional air diffuser connect to adapter on the lowest filter unit to provide a means for air flowthrough to the receiving chambers. The adapters between each filter unit provides aerated water flowthrough to the airlift chamber. The uppermost adapter of all the stacked units provides the connection to the airlift tube.

In the embodiment of a pre-filtering system, the filter is connected to an external filter intake tube. The pedestal base is removed from the filter and is replaced be a flat circular disc. The airlift tube and the top adapter are replaced by a graduated adapter and one or two elbows. One elbow allows for the filter to be placed in the horizontal position and two elbows allow the filter to be placed in the vertical position. The adapter connects the pre-filter to the intake tube of the external filter. The upper portion of the adapter is graduated to permit connections to various tube diameters. Suction from the external filtering device acts as the mechanism by which decontaminated water is drawn through the sponge medium, into the clean water receiving chamber and into the intake tubing.

The discussion the objectives and advantages of this invention will be referred to and explained in further detail with the use of the description of the invention and the drawings, which form an integral part thereof.

DESCRIPTION OF THE PREFERRED EMBODIMENT

Figure 1:
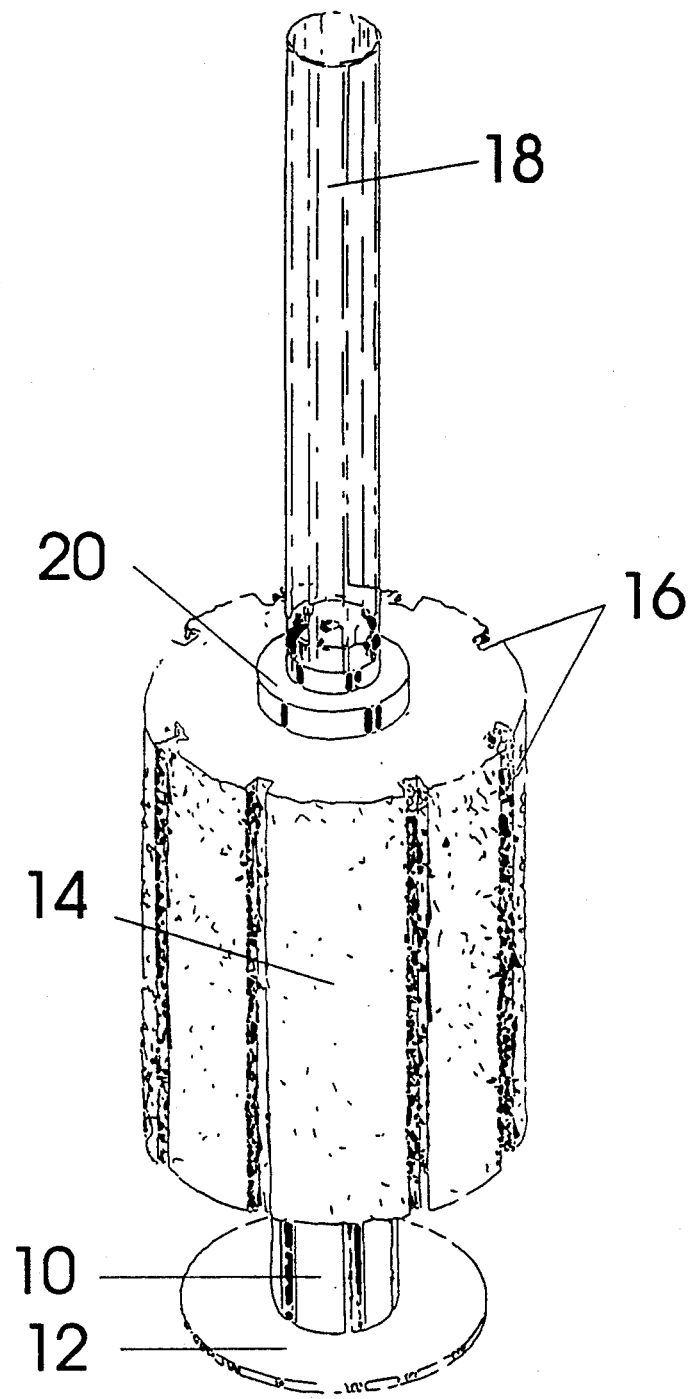
FIG. 1 is a frontal perspective of the assembled filter
Figure 2A:
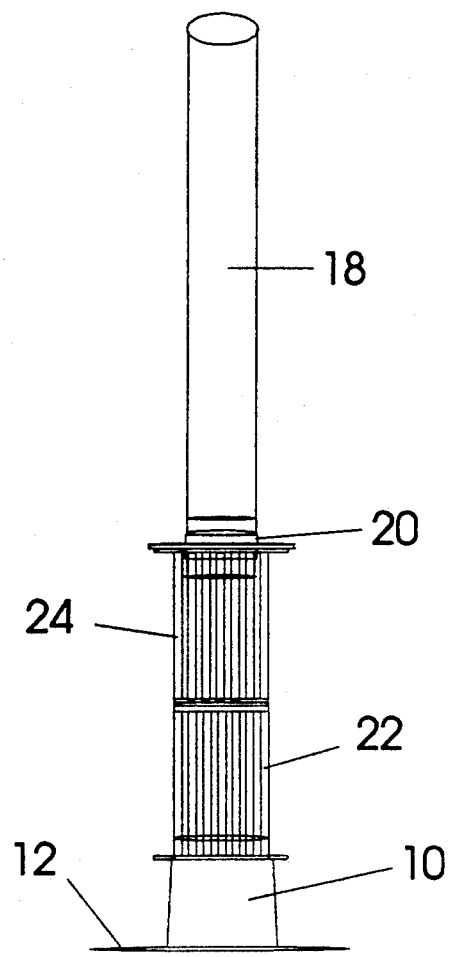
FIG. 2a. is a front elevational view of the assembled filter minus the sponge

Referring now to the drawings, the freestanding bottom aquarium filter shown generally in FIGS. 1 and 2a includes a cylindrical pedestal base 10 mounted on a circular flange 12, a filtering medium 14 with longitudinal rectangular grooves 16, and an air lift tube 18. When the sponge filtering medium is removed from the filter, the interior clean water receiving chamber is revealed. The clean water receiving chamber is composed of 2 interchangeable cylindrical components 22 and 24. The air lift tube is connected to the clean water chamber via a flowthrough adapter 20.

Figure 4:
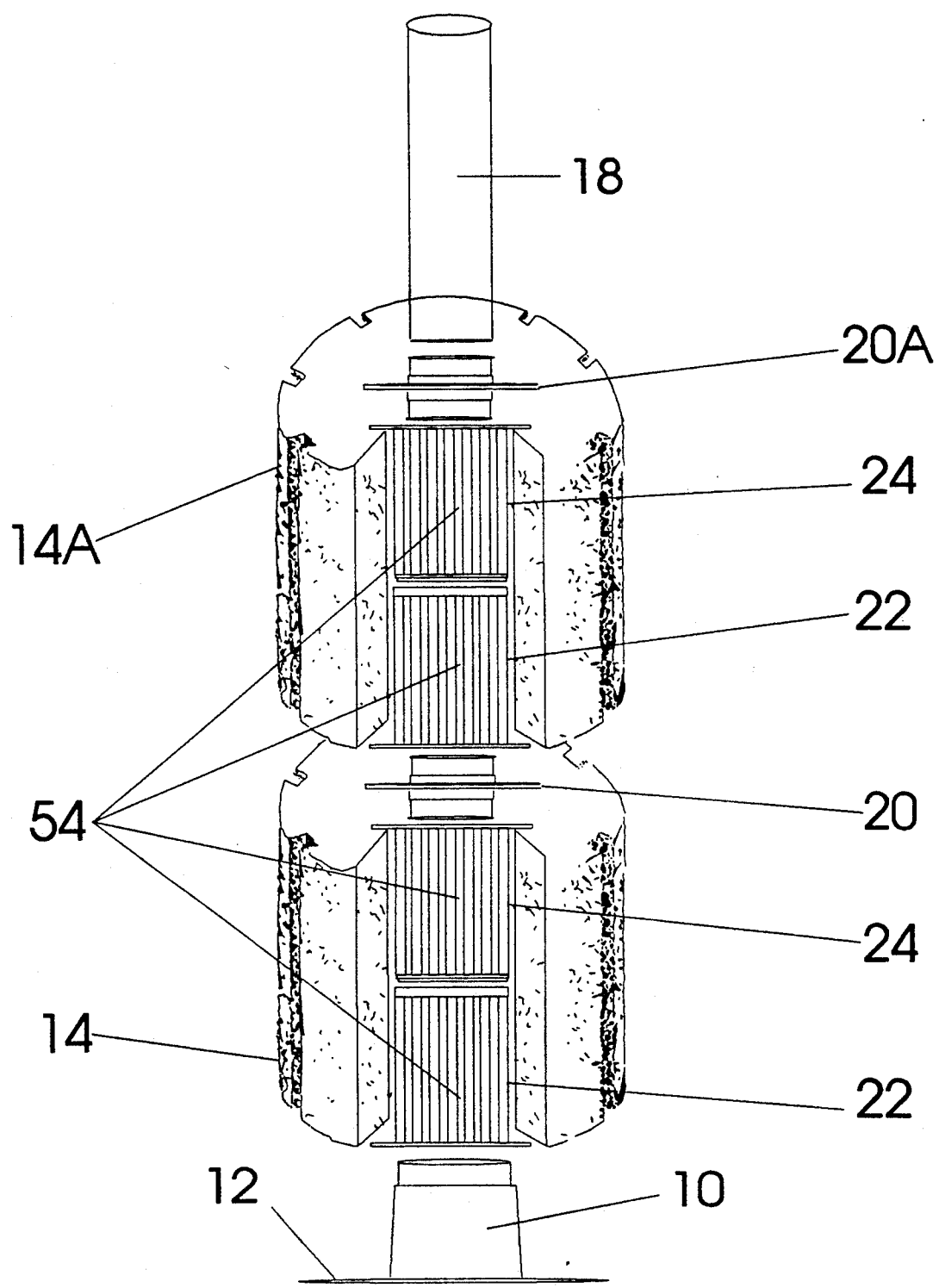
FIG. 4 is a front elevation partially cut away of the multiple sponge filter configuration FIG. 5a. is a front elevational view of assembled filter with optional filter medium cartridge with partial cut away of sponge FIG. 5b. is an exploded longitudinal cross section of the assembled filter of FIG. 1 with the optional filter medium cartridge FIG. 5c. is a perspective of the exploded filter of FIG. 5a FIG. 6a. is an exploded front elevation view of the optional pre-filter configuration without the sponge filter installed along with the adapters FIG. 6b. is an exploded perspective view of the optional pre-filter to external filter adapters
Figure 5A:
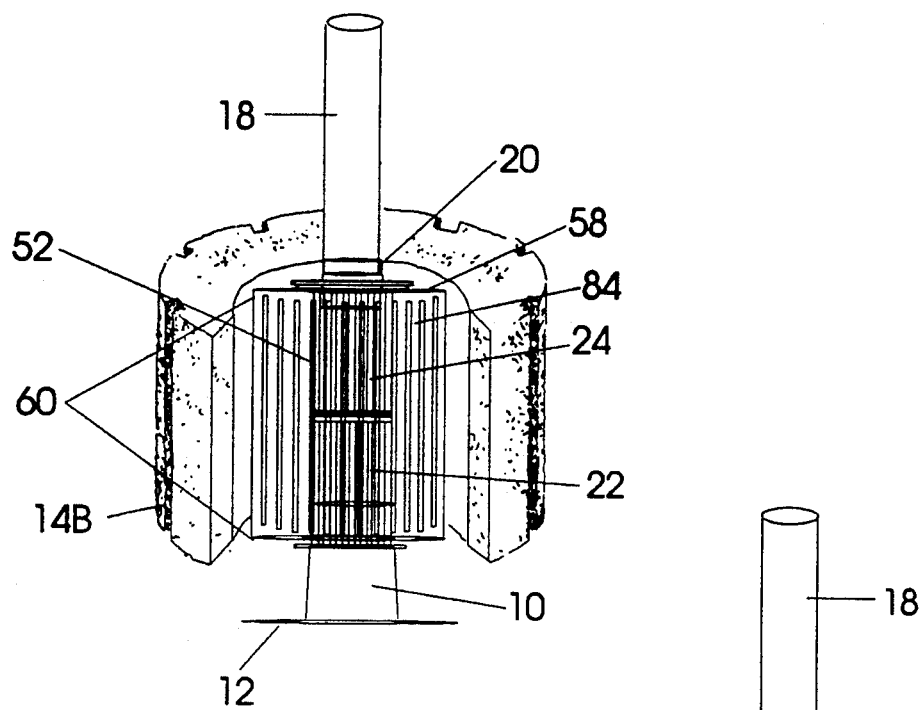
Figure 5B:
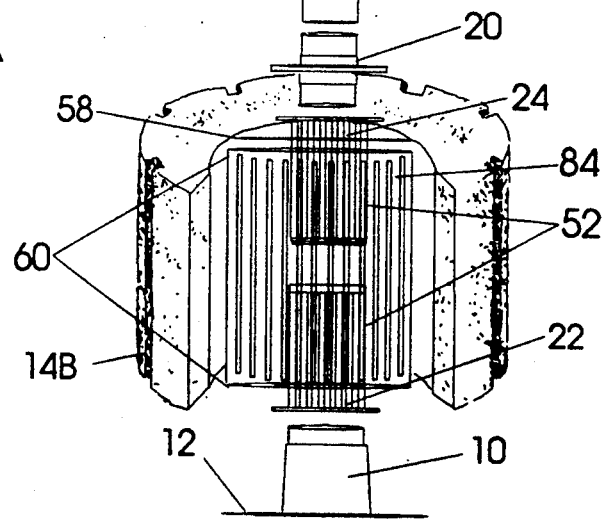

With minimal effort three optional arrangements can be developed: a stackable filter comprising 2 single filter units connected by an additional adapter as best seen in FIG. 4; a filter medium cartridge which comprises a cylindrical filter medium cartridge 60 and a removable cover 58, a sponge filter medium 14b as best seen in FIGS. 5a and 5b and a pre-filter unit which comprises an endcap 64, two identical elbow connectors, cylindrical adapters 70, 72, 74 and a filter medium 14 as best seen in 6a and 6b (Filter medium not shown).

Figure 2B:
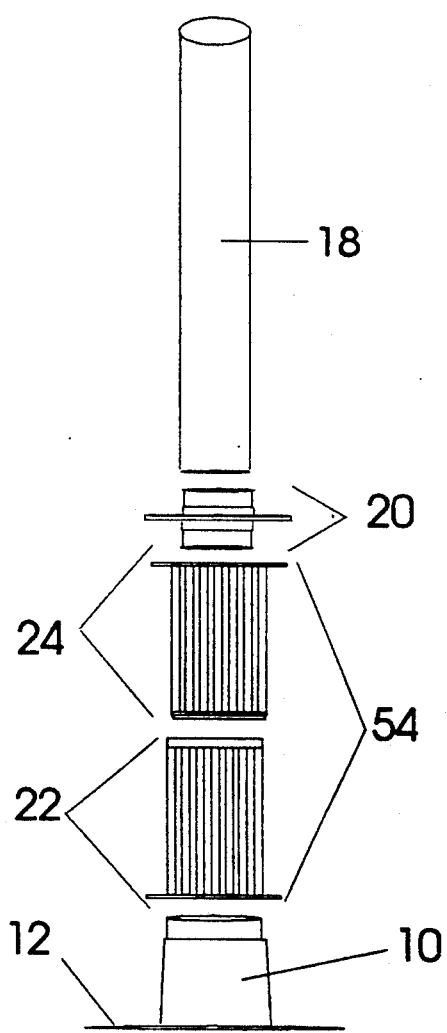
FIG. 2b. is a front elevation exploded view of FIG. 2 of the assembled filter minus the sponge
Figure 3:
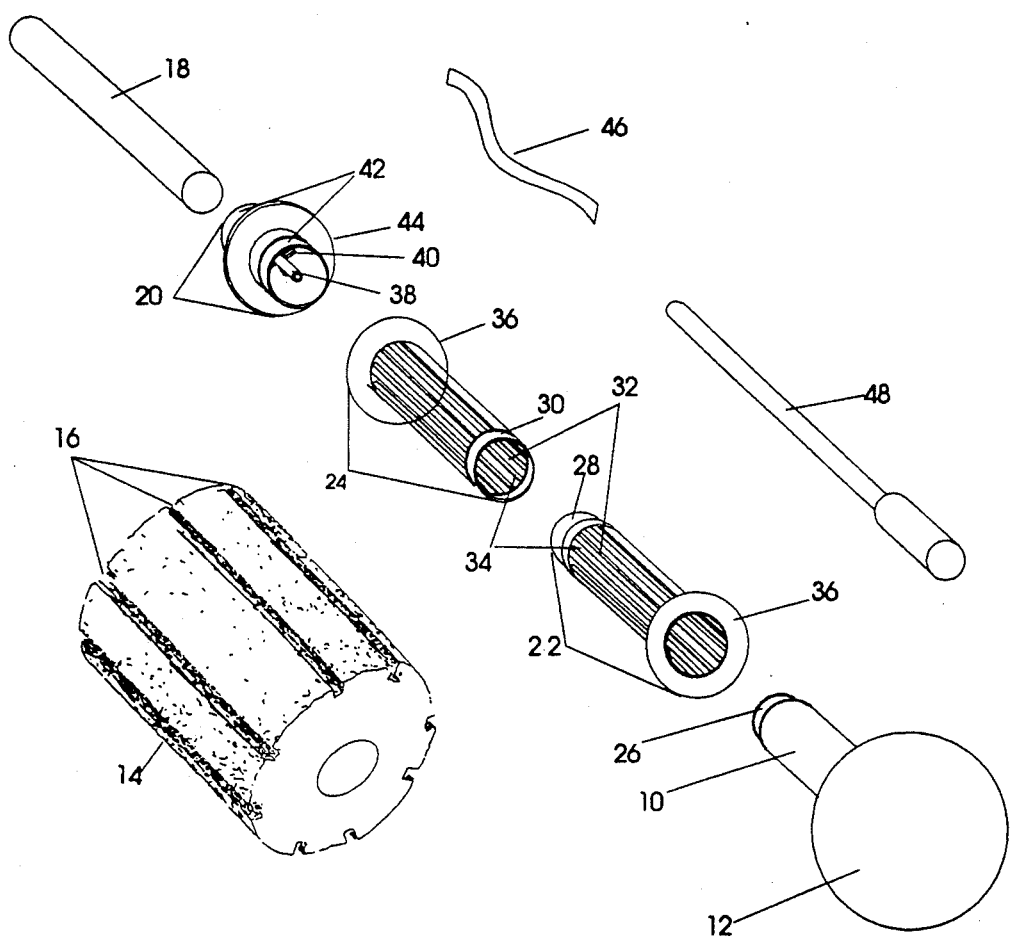
FIG. 3 is a perspective of the exploded filter of FIG. 1

As best seen in FIG. 2b and 3 the components of the filter fit together via male and female connectors imbedded in each component. The cylindrical pedestal base 10 is weighted to prevent the filter from floatation. The base ends in a circular flange 12 which can be covered with the aquarium bottom gravel for additional stability and in a male connector 26 which fits with the lower cylindrical component 22.

The cylindrical components 22 and 24 which comprise the clean water receiving chamber 54, are attached together via another male/female coupling of 28 and 30. The portions of each cylinder 36 which comprise the exterior ends of the receiving chamber are identical, permitting components 22 and 24 to be reversed at the base and adaptor junctures. Each of the cylindrical components consists of a series of longitudinal slits 32 and beams 34 which alternate about the circumference of the cylinder. These slits 32 are the means by which the decontaminated water from the sponge filter 14 enters into the clean water receiving chamber. This longitudinal orientation of the slits about the entire circumference of the cylinder permits a higher rate and more even distribution of water flow through the filter.

The upper end receiving chamber is attached to an adapter 20 which permits the clean aerated water to pass into the air lift tube 18 and out into the aquarium. The circular adapter 20 is vertically symmetrical about the center lip 44. Below this lip 44, the adapter is a male connector 42 which fits in the interior of the upper portion of the receiving chamber end 36. The entire adapter is an annulus which permits the water passage into the air lift tube 18. About the center of the exterior annulus is situated an interior annulus 38. This interior ring is a double-sided nozzle in which the superior nozzle is inserted into airtubing 46 and permits the inflow of air from an exterior air supply through the air lift tube 18 to the bottom of the receiving chamber. An optional air diffuser 48 can be attached to the lower nozzle. The air diffuser 48 permits more efficient aeration of the decontaminated water as well as increased flow rates. The interior and exterior portions of the adapter 20 are connected via slender rectangular crossmembers 40 which extend radially from the interior ring to the exterior wall. A minimal number of crossbeams is used to maximize the open area of the adapter. The upper end 42 of the adapter 20 is connected to air lift tube 18 to form the basic filter. The diameter of the air lift tube is comparable to the interior diameter of the outer adapter ring and receiving chamber to reduce the incidence of choking of the aerated water in the air lift tube and other filter chambers.

The afore description of the present invention pertains to the basic filtering system. Enhanced filtering capability of the filter can be obtained by the addition of more sponge filters and clean water chambers. These additions are pictorially described in FIG. 4. Instead of coupling the air lift tube 18 to the adapter 20, an additional sponge filtering medium 14a, clean water receiving 54, and adapter 20a are connected in the identical manner as the lower filter. The air lift tube is attached to the uppermost adapter 20a. Multiple filtering mediums can be added in this manner to obtain the necessary filtering capability to accommodate aquariums of various capacities. It should be noted that this arrangement has several advantages over prior art filters. For large capacity aquariums, prior art filters require the addition of multiple filters and containers. With this present invention, only one air supply source, such as a pump, is needed, and since the filtering mediums are oriented vertically, no additional aquarium bottom space is required.

Figure 5C:
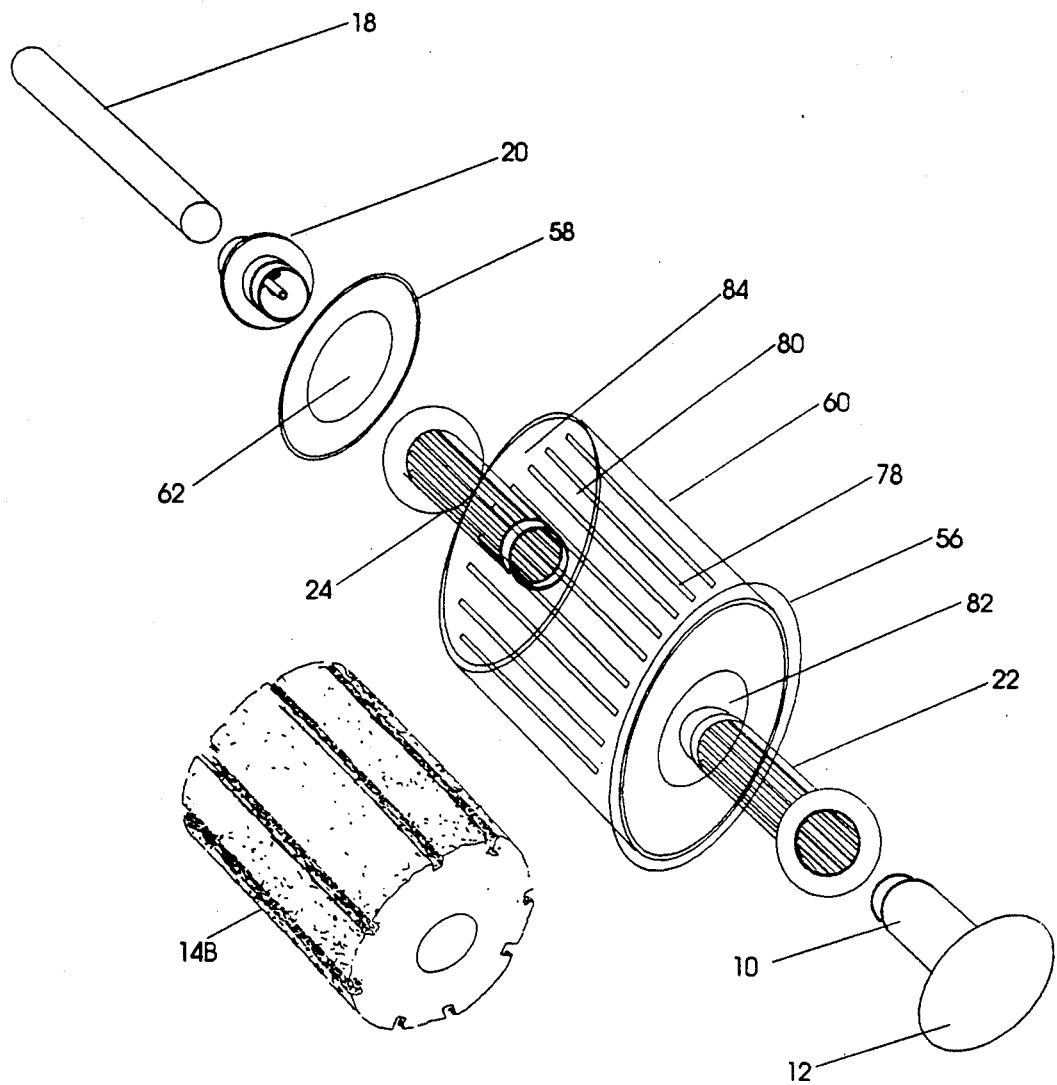

This present invention also permits the utilization of commonly applied chemical filtration methods in a similarly efficient manner. As depicted in FIG. 5b and FIG. 5c, a substantially cylindrical filter medium cartridge 60 has longitudinal slits 78 and beams 80 which alternate about the circumference of the cartridge. These slits are the means by which water from the sponge filter medium 14b enter the filter medium chamber 84. An aperture 82 in the base of the filter cartridge allows for the penetration of the cylindrical components 22 and 24 mounted on the pedestal base which forms the interior wall of the filter cartridge 52. The sponge filter medium 14b with an aperture which accommodates the filter medium cartridge like a sleeve, rests on a circumferential projection 56 at the base of the filter medium cartridge. A circular flat disk 58 with an aperture 62 which accommodates the superior portion of the upper cylinder serves as a removable cover. The adapter 20 attaches through the aperture to the upper cylinder. All of the remaining components are connected identically as in the basic and multiple filtering designs.

Figure 6A:
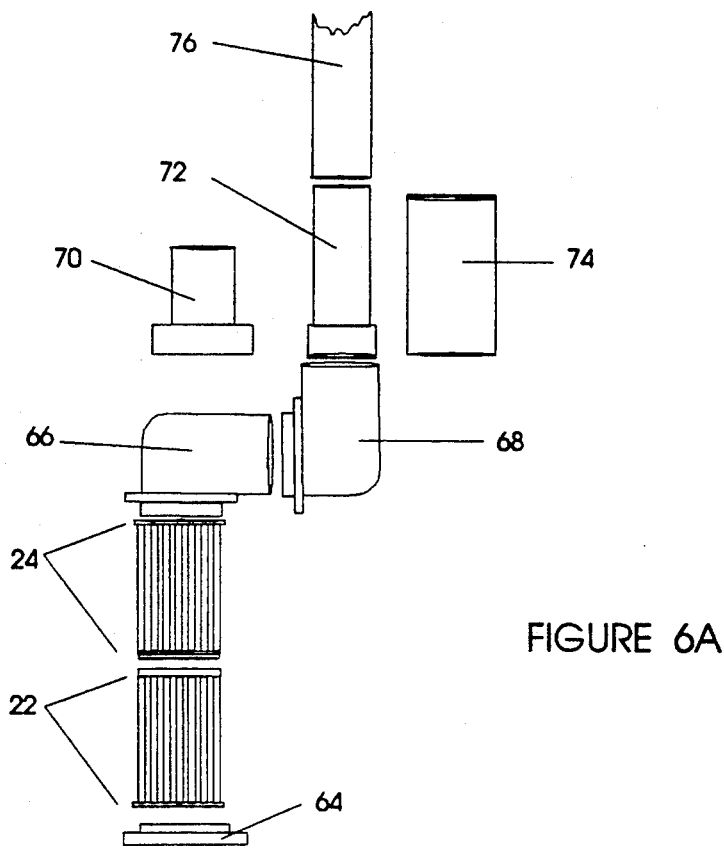
Figure 6B:
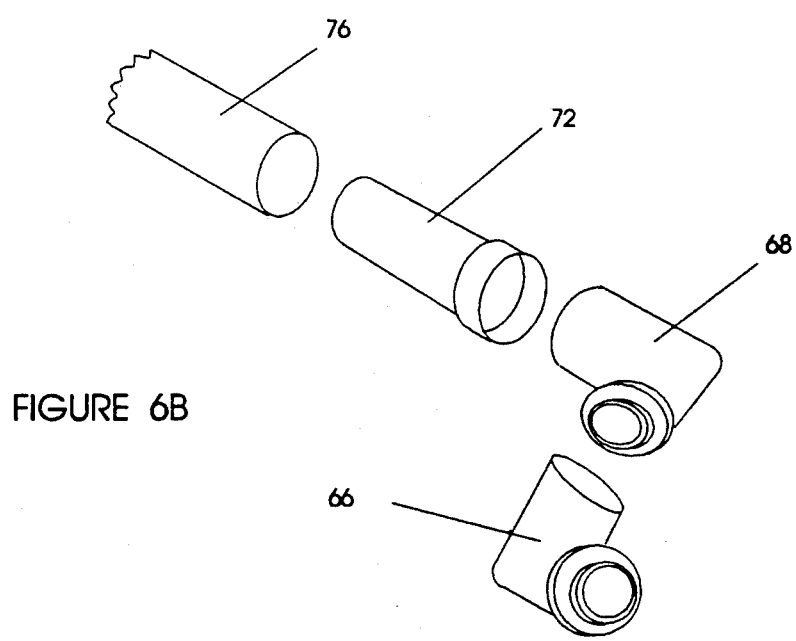

The versatility of the present invention is also demonstrated by another optional configuration in which the filter can be used as a pre-filter for external aquarium filters. This pre-filtering arrangement as best seen in FIG. 6a and 6b permits the initial scrubbing of the water so that less pollutants reach the exterior system, prolonging the life of main filter. The present invention can be configured as a pre-filter by removing the base section 10, and replacing it with a circular disk 64 to act as an end cap or plug. This disk prevents water from entering the bottom of the filter. The adapter 20 is replaced by two new elbow connectors 66 and 68 which are identical, and offer a vertical position of the filter. A single elbow connection offers the horizontal position. These connectors form a passage for the fluid comprising of a double right angle offset. This offset permits the placement of the pre-filter away from the aquarium vertical walls. The air lift tube 18 is replaced by one of three near cylindrical adaptation tubes, 70, 72, 74, which are configured to mate on the lower end with the elbow connector 68 and on the upper end with a primary filter intake tube. Three configurations of the adapters are provided so that a smooth fit with the most commonly utilized filter intake tubes can be achieved. The longitudinal cylindrical walls of the adapters 70, 72, 74 are canted slightly inward so that the upper end of the adaptor slides into the lower end of the filter intake tube 76.

In operation for all configurations, except for the pre-filter the filter is assembled and placed in the bottom of an aquarium. For bottom freestanding operation, gravel can be situated on the flanged base 12 for extra stability. The external air supply is hooked up and air flow through the filter is commenced. Contaminated water will then flow through the sponge 14 from any location along the circumference, and both ends. As the water is pulled through the sponge, it is filtered through the diffusion action of the sponge and any bacterial growth residing therein. If desired, the water is then passed through a filter medium cartridge 60. As the water is decontaminated by these filtering mediums, it enters the clean water receiving chamber formed by the cylindrical straining components 22 and 24. Air from the external supply enters the bottom of this same chamber via an air tube 46 and an optional air diffuser 48. As the air rises to the top of the filter, it mixes with the decontaminated water and forces the water to rise with it. It passes through the adapter 20 and the air lift tube 18, returning to the aquarium tank. The pre-filtering action is identical, except that the water is pulled through the filter by a suction from the main filter intake tube, and the water exits from the receiving chamber into the elbow connector 66 and into the main filter intake tube 76.

It should be appreciated that with the present construction, the many chambers through which the water passes in prior art filters have been consolidated into one cylindrical tube. Throats within this tube have been eliminated or minimized so that choking of the water flow does not occur at higher flow rates.

Because of the pedestal mounting and vertical construction of the present invention, the sponge filter utilizes all four of its surfaces-three for contaminated water inflow and one for clean water outflow. This utilization permits more surface area to act as inflow area which increases the amount of water which can flow through the filter while it decreases the velocity of the water into the filter, permitting small fish to swim close to the filter without fear of entrapment. Because of the minute perforations of the sponge surface, fish and plant life of all observable sizes are protected against entanglement within the filter.

Since the filter is comprised of open cylindrical components and flat connectors or adapters, all areas are exposed and are easily cleaned without insertion of narrow brushes. The sponge is easily cleaned by compressing it under running clean water several times and replacing it on the filter base. The pre-filter can be cleaned without simultaneously cleaning the filter, preserving the bacterial life which acts as an additional filtering agent. Because the sponge utilization area is so large, it does not have to be cleaned as often and is reusable.

The position of the air tubing and the air diffuser in the filter provides for maximum water lifting capability within the filter. The air enters the clean water chamber and the water rises vertically through the longitudinal axis of the chamber. This permits the mixing of air with water for the entire length of the chamber, as well as for the entire circumference of the chamber. Because the water enters the chamber with a relatively even distribution, better mixing qualities and aeration levels occur. Higher rates of airflow act as suction to increase the water inflow around the entire sponge filter(s). The use of multiple sponge filters permits even higher rates of airflow into the filter since additional water can be drawn in. Because such a large percentage of the sponge is used for water inflow intake, clean water flow is not obstructed by the introduction of the air tubing within the center of the air lift tube 18 and receiving chamber 22 and 24, as is the case with many other prior art filters.

All of the components of this filter are cylindrically shaped to avoid planar surfaces which, though occurring in the prior art square and rectangular filters, can trap fish between the filter and the aquarium walls.

Although the filter has been described as being circular in cross-section, it should be appreciated that other shapes such as ellipses, triangles, squares and others, could be utilized to form the filter, and still retain many of the unique benefits of this invention.

There has been described heretofore the best embodiment of the invention presently contemplated. However, it is to be understood that various changes and modifications may be made thereto without departing from the spirit of the invention.

I claim:

1. An aquarium filter comprising a pair of cylindrical tubes, a first tube of said pair of cylindrical tubes including a flange on a first end thereof and a male connector on the second end thereof, a second tube of said pair of cylindrical tubes including a flange on a first end thereof and a female connector on the second end thereof, said male and said female connectors being selectively fit together for defining a clear water chamber within said pair of cylindrical tubes, said first tube and said second tube defining a plurality of slits extending generally from said first end to said second end for allowing the entrance of water into said clear water chamber, a sponge filter medium defining an opening therethrough, said opening being sized to snugly receive said pair of cylindrical tubes, said sponge filter being sized to be received between said flange on said first tube and said flange on said second tube when said male and female connectors are fixed together, plug means selectively receivable in said first end of said cylindrical tubes, said plug means acting to prevent fluid flow into said clear water chamber, adapter means selectively receivable in said first end of said cylindrical tubes, and pipe means, said adapter means defining an opening axially therethrough and serving to connect said clear water chamber to said pipe means.

2. An aquarium filter as claimed in claim 1, said plug means comprising a base, said base including a flange for resting on the bottom of an aquarium, said base supporting said sponge filter above the bottom of the aquarium, and having sufficient weight to prevent floating of said aquarium filter.

3. An aquarium filter as claimed in claim 2, said adapter further including a nozzle coaxially fixed in said opening through said adapter, said pipe means comprising an air lift tube, and air supply means connected to said nozzle.

4. An aquarium filter as claimed in claim 1, and further including a second pair of cylindrical tubes, a first tube of said second pair of cylindrical tubes being received on said adapter, a second sponge filter medium surrounding said second pair of cylindrical tubes, and a second adapter received in a second tube of said second pair of cylindrical tubes.

5. An aquarium filter as claimed in claim 1, said pipe means comprising at least one elbow for connecting said aquarium filter to pumping means.

6. An aquarium filter as claimed in 1, said sponge filter medium defining a cavity surrounding said cavity therethrough, a filter cartridge selectively receivable within said opening, and a chemical filter medium received within said cartridge, said cartridge defining a plurality of slits therein for allowing the passage of water through said cartridge and through said chemical filter medium.

* * * * *